Jan. 16, 1923.
M. VERNAZ.
CHUCK.
FILED MAR. 16, 1920.
1,442,107.
2 SHEETS—SHEET 1.
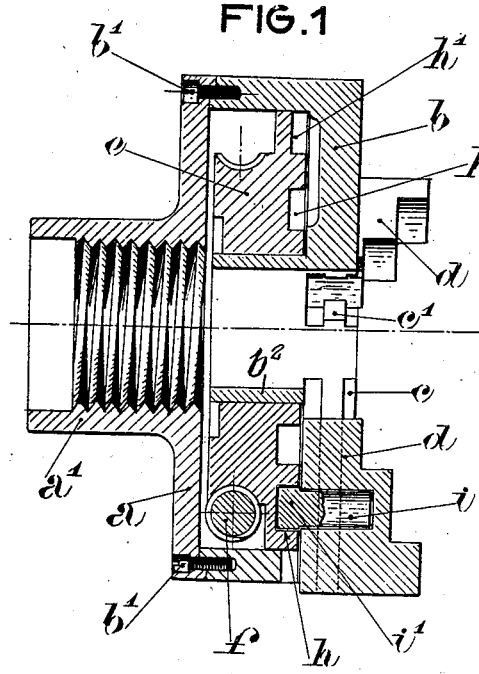
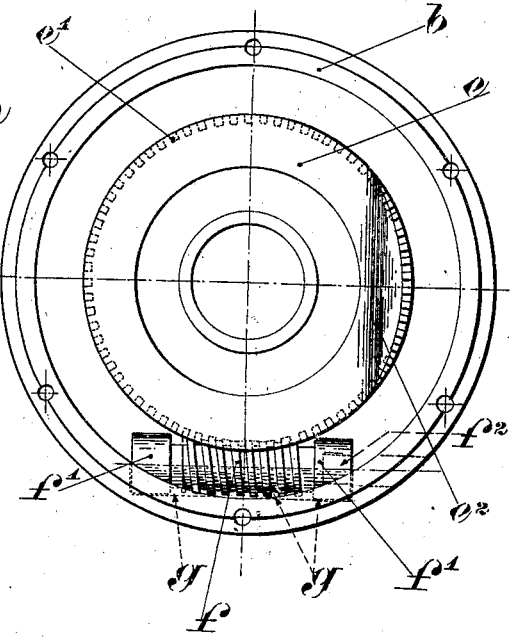
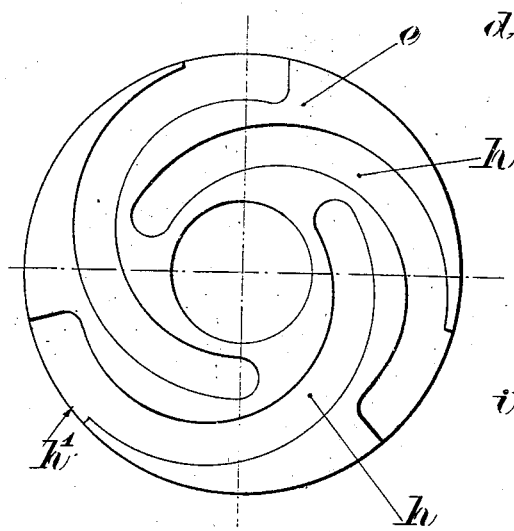
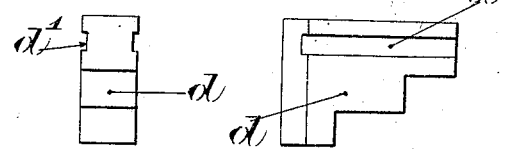
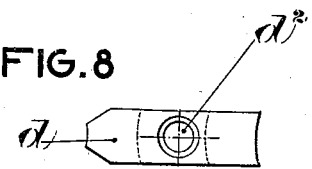
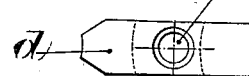
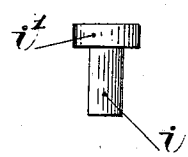
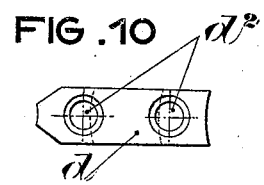
Witnesses
Jean Termain
Guillaume Dioche
Inventor
Marcel Vernaz Jan. 16, 1923.

M. VERNAZ.
CHUCK.
FILED MAR. 16, 1920.

Witnesses

Inventor

Patented Jan. 16, 1923.

1,442,107

UNITED STATES PATENT OFFICE.

MARCEL VERNAZ, OF LYON, FRANCE.

CHUCK.

Application filed March 16, 1920. Serial No. 366,226.

*To all whom it may concern:*

Be it known that I, MARCEL VERNAZ, mechanic, of Claudiennes, Lyon, France, have invented certain new and useful Improvements in Chucks, of which the following is a specification.

This invention relates to a chuck with reversible jaws for lathes, boring machines and all machine tools in general.

The chuck may comprise any suitable number of reversible jaws each so designed that a single set of jaws is sufficient for gripping bars of very different thicknesses.

The tightening and loosening of the jaws is obtained by the action of eccentric circular grooves or inclines which have the advantage of offering a large surface of support to the knobs of the axle pins of the jaws in all the positions of said jaws.

The annexed drawing illustrates an example of construction of the improved chuck.

Fig. 1 is a longitudinal section.

Fig. 2 is a front view, the fixing plate on the machine tool being removed.

Fig. 4 is a front view of the disc showing the eccentric grooves or inclines.

Figure 3:
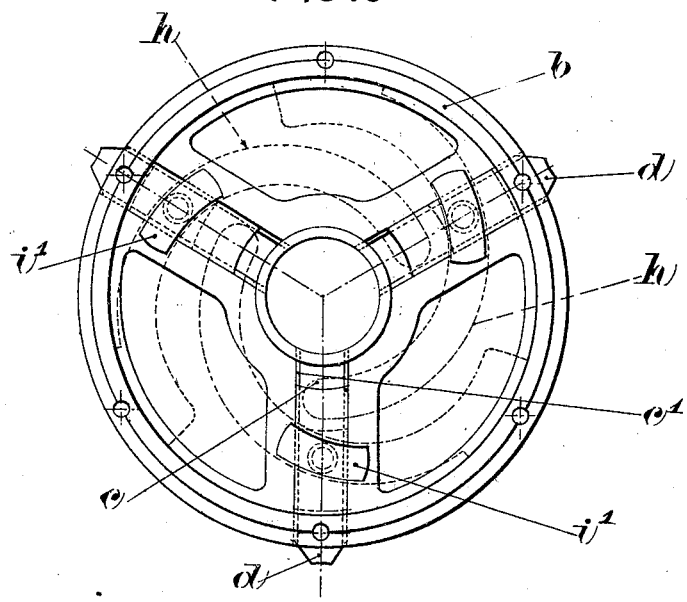
Fig. 3 is a front view of the cage in which the bits slide, the position of the eccentric grooves being shown in dotted lines.
Figure 5:
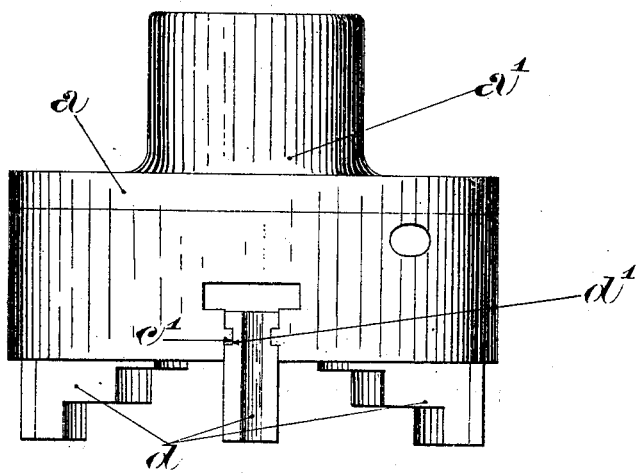
Fig. 5 is an outer elevation of the chuck.

Figs. 6, 7, and 8 are detail views respectively in front view, side view and plan of the reversible jaws.

Fig. 9 is a detail view of the axle pin of the jaws.

Fig. 10 is a plan view of a modification of the jaw.

$a$ indicates a plate provided with a sleeve $a^1$ for mounting the chuck on a lathe, boring machine or other machine tool. On this plate is fixed by screws $b^1$ a circular cage $b$ provided with radial slots $c$ in which the jaws $d$ slide.

These slots have interiorly on each face a small longitudinal tenon $c^1$ which engages in a corresponding mortice of the jaw and ensures perfect guiding of the latter.

In the interior of the cage $b$ is adjusted a disk $e$ turnable with slight friction on the core $b^2$ of the cage. This disk carries externally helicoidal teeth $e^1$ engaging with a worm $f$, the trunnions $f^1$ of which are embedded in a housing $g$ provided for this purpose in the wall of the cage $b$. The rotation of the screw $f$ is obtained from outside by means of a key engaged in the square recess $f^2$ with which one of the trunnions $f^1$ is provided.

In order to facilitate the placing in position of the screw $f$ the disc $e$ has a cut-away portion $e^2$ which when it is brought opposite the screw allows of introducing the latter into its housing or of withdrawing it at will. When the disc has made a certain rotation, the screw is held in place by the rim of the latter.

On its inner face the disc $e$ is provided with eccentric circular grooves or inclines $h$ each extending through an arc of 180° in each of which is guided a knob $i^1$ for moving the jaws. These knobs which follow the curves of the grooves $h$ are provided with pins $i$ which serve as axles to the jaws $d$ provided for this purpose with one or more housings $d^2$ in which the said axles turn.

The working of the chuck is as follows:—

By turning the screw $f$ rotation of the disc $e$ is produced the grooves $h$ of which in acting on the knobs $i^1$ cause the simultaneous approach or separation of the jaws. It is to be observed that in this movement the knobs possess in all their movements a large surface of support in the grooves $h$, the knobs being shaped to the curvature of the grooves. Further, the larger the piece to be gripped between the jaws the slower and more powerful the pressure as the curve of the grooves has a tendency to become progressively parallel to the periphery of the disc in which they are formed.

To facilitate the placing in position of the jaws the terminal openings of the grooves, at the circumference, are of unequal widths. First one knob (with its jaw) is introduced into the narrowest opening. The plate $e$ is then slightly turned and when the knob is sufficiently engaged in the slot it cannot fall out, and need not be held in by hand even if the opening is facing downwards. Then the mandril is turned 120°, and the second knob is inserted through the next opening. The plate $e$ is again slightly turned, to engage this knob with its slot, and the mandril is given another turn of 120°, wherein the third knob is inserted. The jaws are then set, as usual by means of the worm $f$. Without this device the bits would require to be held by hand until sufficiently engaged with the slots.

To change the jaws it is sufficient to adjust the disk $e$ until the jaws come opposite the outlets $h^1$ of the grooves, then, after giving them a half turn on the axles $i$ of the knobs $i^1$ to put them in place by a reverse movement of the disc $e$. When the jaws have several housings $d^2$ for the pins $i$ (Fig. 10 shows two by way of example) it is possible by inserting the pins of the respective jaws in one or the other of said housings to modify the extreme separation of the jaws.

What I claim as my invention and desire to secure by Letters Patent of the United States is:—

Chuck for lathes, machine tools and the like comprising a circular cage having a series of radial guideways on its outer face, means for attaching said cage to the lathe or the like, a core concentric with and within said cage, a disk rotatable within said cage on said core, said disk being provided with eccentric circular guideways each extending through an arc of 180° on its outer face, the terminal openings of which are situated on the circumference of the disc and have unequal widths, jaws slidable in said radial guideways, each of said jaws being provided with one or more bores, independent pins, the stems of which engage in said bores and the heads of which engage in said eccentric circular guideways, and means for imparting rotary movement to said disk from the exterior of said cage whereby said jaws are slid in said radial guideways.

In witness whereof I have signed this specification in the presence of two witnesses.

MARCEL VERNAZ.

Witnesses:
JEAN GERMAIN,
ALEXIS VERNAZ.